(12) United States Patent
Tiley et al.

(10) Patent No.: US 8,517,837 B2
(45) Date of Patent: Aug. 27, 2013

(54) CONTROL UNIT FOR A VIDEO GAMES CONSOLE PROVIDED WITH A TACTILE SCREEN

(75) Inventors: Andrew Tiley, Southampton (GB); Yannick Allaert, Bauvin (FR); Alain Falc, Kortrijk (BE); Mark Liddle, Bracknell (GB)

(73) Assignee: Bigben Interactive, Société Anonyme, Lesquin (FR)

( * ) Notice: Subject to any disclaimer, the term of this patent is extended or adjusted under 35 U.S.C. 154(b) by 0 days.

(21) Appl. No.: 13/514,463

(22) PCT Filed: Dec. 3, 2010

(86) PCT No.: PCT/EP2010/068809
§ 371 (c)(1),
(2), (4) Date: Aug. 10, 2012

(87) PCT Pub. No.: WO2011/069900
PCT Pub. Date: Jun. 16, 2011

(65) Prior Publication Data
US 2012/0322558 A1    Dec. 20, 2012

(30) Foreign Application Priority Data
Dec. 8, 2009    (FR) ...................................... 09 05945

(51) Int. Cl.
*A63F 9/24*    (2006.01)
(52) U.S. Cl.
USPC ................................................ 463/37; 463/1
(58) Field of Classification Search
USPC ............. 463/31–43; 705/14.36; 273/148 B, 273/292
See application file for complete search history.

(56) References Cited

U.S. PATENT DOCUMENTS

| | | | |
|---|---|---|---|
| 6,921,336 B1 * | 7/2005 | Best | 463/32 |
| 7,347,780 B1 * | 3/2008 | Best | 463/37 |
| 8,167,720 B2 * | 5/2012 | Sugioka et al. | 463/36 |
| 8,246,460 B2 * | 8/2012 | Kitahara | 463/37 |
| 2003/0216179 A1 * | 11/2003 | Suzuki et al. | 463/35 |
| 2009/0048930 A1 * | 2/2009 | Taylor | 705/14 |
| 2010/0151948 A1 * | 6/2010 | Vance et al. | 463/43 |

FOREIGN PATENT DOCUMENTS

EP    1757343 A1    2/2007

OTHER PUBLICATIONS

International Search Report for Application PCT/EP2010/068809 dated Jan. 19, 2011.

* cited by examiner

*Primary Examiner* — Masud Ahmed
(74) *Attorney, Agent, or Firm* — Honigman Miller Schwartz and Cohn LLP

(57) ABSTRACT

A control unit for a home video game console, including a control unit body, a display supported by the control unit body for displaying information and/or images relating to the game, and a recess defined by the control unit body for accommodating a second control unit equipped with an accelerometer and/or with tilt sensors. The recess has an electrical connection between the two control units, wherein the displayed information and/or images are changed in response to signals received by the accelerometer and/or the tilt sensors and transmitted to the display through the electrical connection. A touch screen overlying at least partially over the display, detects tactile commands including a sequence of locations touched on the screen able to change the displayed information and/or images.

20 Claims, 6 Drawing Sheets

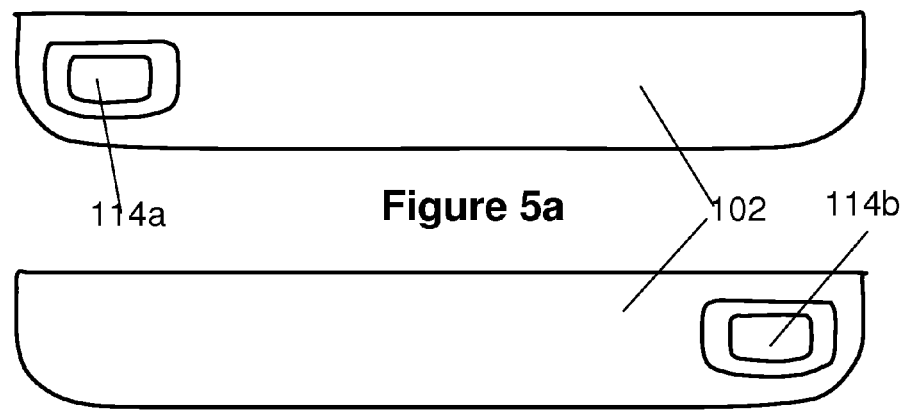
Figure 5a
Figure 5b
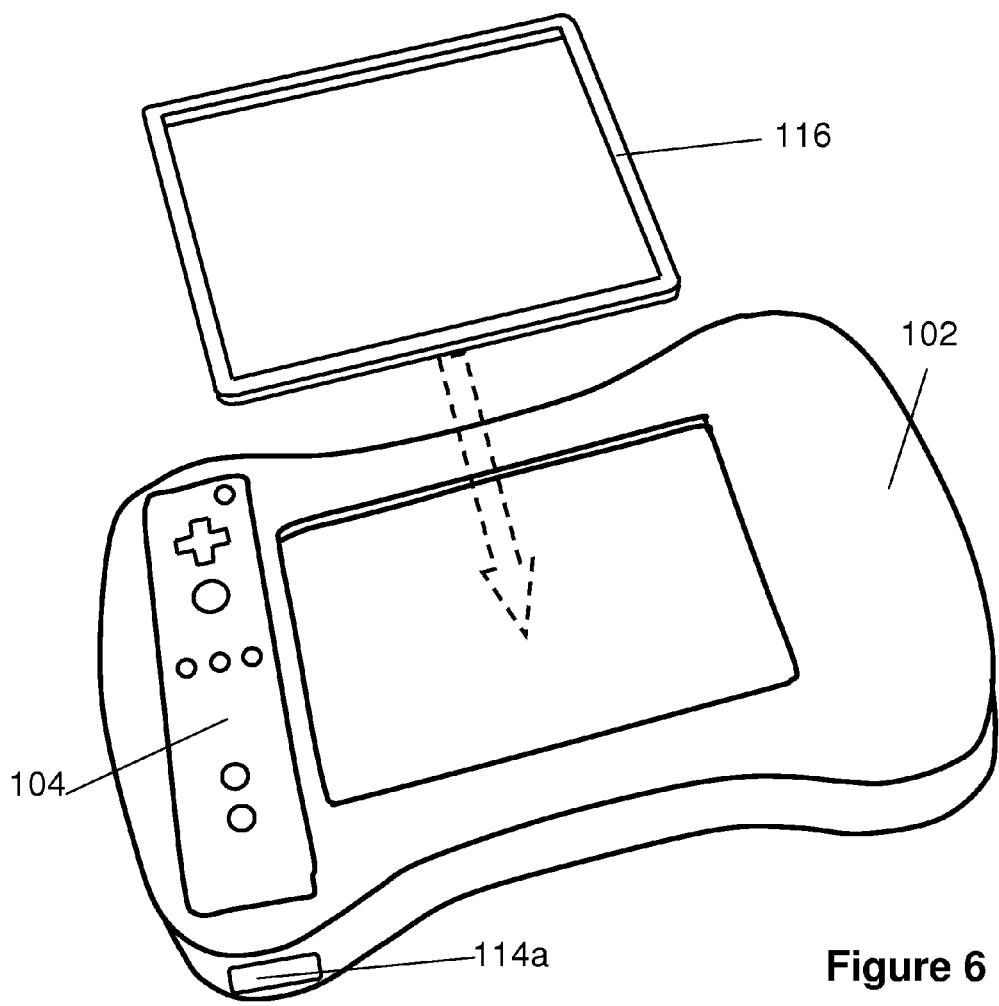
Figure 6

CONTROL UNIT FOR A VIDEO GAMES CONSOLE PROVIDED WITH A TACTILE SCREEN

TECHNICAL FIELD

This disclosure relates to a control unit for a home video game console including a display, a game controller including a control unit as well as a game system including a second game controller.

BACKGROUND

The use of a substantially parallelepipedic control unit 2, illustrated in FIG. 1, is known in the prior art. This control unit 2 is equipped with several sensors (not shown) enabling it to locate itself in space and to transcribe its movements to a central screen connected to a home video game console. Such a control unit provides a new way of playing, more immersive for the player.

Also known in the prior art is a game system, illustrated in FIG. 2, including a home video game console 4 provided with an optical disk reader 6 for reading optical disks 8 serving as game media, and a connecting cable connected to a central display unit 10 such as a television screen serving as a common display device for all the players, connected to an audio device 12. The console 4 is also connected to one or more control units 14, 16 by connecting cables 18. The control unit 16 is equipped with a liquid crystal display screen 20 (LCD) and includes a recess for receiving an external storage device 22. An accelerometer is located either directly inside the control unit 16 or in the external storage device 22 inserted into the recess provided for this purpose. The motions carried out by the player holding a control unit enables changes to the display on the central televisions screen by processing the signals received by the accelerometer.

Such a game system also makes it possible to improve the immersivity of the players in the flow of the game. Nevertheless, this system exhibits certain drawbacks; in particular the LCD screen 20 of the control unit 16 has no dedicated use and is not used to further increase the game immersivity. The player's control possibilities combine the traditional control buttons, to which are added the signals received by the accelerometer of the control unit. However, these controls do not allow fast and direct interactivity of the player with information and/or images or sequences relating to the game so as to be able to modify or personalize them.

A game system illustrated in FIG. 2, is also known in the art, and includes a home video game console 24 equipped with an optical disk reader 26 for reading optical disks 28 used as game media and a connecting cable 30 connected to a central display device 32, such as a television screen used as a common display for all the players and including an audio output 34. The console 24 is also connected to one or more control units 36 and 38 by connecting cables 40. The control units 36, 38 are each equipped with a liquid crystal display screen (LCD) 42 on which are displayed information and/or images relating to the game. A touch screen 44 overlying the LCD screen enables detection of touch commands in the form of a sequence of locations touched on the screen to more quickly change the information and/or images displayed.

Even though such a game system allows for better interactivity of the players with the flow of the game, it nevertheless exhibits certain drawbacks. Indeed, such a system has limited game immersivity, the player not having the benefit of commands allowing detection of game controller motions capable of changing the display of information and/or images relating to the game.

The present disclosure responds to the different drawbacks mentioned above and in particular to provides a simple and low-cost control unit capable of providing both good immersivity and good player interactivity with the flow of the game and more particularly with information and/or images displayed on this control unit.

SUMMARY

Within the scope of the present disclosure, a new solution was considered that would consist of using a control unit to which would be added tactile control means via a touchscreen overlying the control unit's display, resulting in a new game control that is relatively costly and which is in addition useless for a certain number of games requiring only the immersive characteristic without needing the interactive characteristic. For these reasons, a solution was preferred that would take advantage of the simplicity and of the advantages of the control unit illustrated in FIG. 1, which while still providing the traditional control buttons of a gamepad also provides means of detecting motion.

One aspect of the disclosure provides a control unit for a home video game console, including a display for displaying information and/or images relating to the game and a recess capable of accommodating a second control unit equipped with an accelerometer and/or tilt sensors, the recess being provided with electrical connection between the two control units, the displayed information and/or images are capable of being changed by signals received by the accelerometer and/or the tilt sensors and transmitted to the display through the electrical connections, and in that a touch screen is provided that overlies at least partially the display and detects tactile commands in the form of a sequence of locations touched on the screen that are also able to change the displayed information and/or images.

Due to its compatibility with a second control unit equipped with an accelerometer and/or tilt sensors, the first control unit proves to be cost effective, while still providing the desired immersive and interactive characteristics and while still affording the opportunity to use the second control unit, alone or with other accessories.

Implementations of the disclosure may include one or more of the following features. In some implementations, the changed information and/or images are transmitted through the electrical connection to the second control unit equipped with a communicator with the video game console. In this manner, the changes affecting the information and/or images displayed on the display of the control unit can be transmitted through the second control unit to the game console, then to the central display, such as a television set.

According to another advantageous embodiment, the signals received from the accelerometer and/or from the tilt sensors through the electrical connection with the second control unit and the tactile commands received via the touch screen are able to simultaneously change the information and/or images displayed. The simultaneous use of both displays makes possible a further increase in the possibilities offered in terms of immersion and of interaction with the player.

According to another advantageous embodiment, a power supply source is provided by the second control unit via electrical contacts located in the bottom of the recess. The use of the power from the second control unit to supply the first makes it possible to simplify and to further reduce the costs of this first control unit.

According to another advantageous embodiment, the touch-screen is the only control member of the control unit for direct interaction with the displayed information and/or images. Such a control unit having only the touch-screen as a control member, not counting those present on the second control unit of course, proves to be even simpler and less costly to manufacture.

According to another advantageous embodiment, the recess is made in the face bearing the display, so as to leave the control buttons of the second control unit accessible, and an opening is made on a lateral face facing the communication of the second control unit when it is inserted in said recess. Such a recess allows without difficulty the use of the control buttons and communicator of the second control unit positioned within the recess. Advantageously, the display is reversible and the recess includes an outline that is able to accommodate the control unit in two opposite positions and including a detector for detecting the insertion orientation of the control unit serving as means of controlling the reversal of the display. The detector for detecting the insertion orientation may be an automatic detector, consisting for example of the electrical power supply contacts for the first unit placed in the bottom of the recess. Thus, the control unit can be used as easily by a right-handed person as by a left-handed person depending on the insertion orientation of the second control unit into the recess provided for that purpose.

According to another advantageous embodiment, the touch screen includes a peripheral frame capable of holding game boards or grids.

According to another advantageous embodiment, the control unit also includes a plug capable of accommodating an accessory for constituting an immersive combination. Advantageously, the plug includes means of electrical connection with the accessory.

A second aspect of the disclosure provides a game controller including a first control unit according to the first aspect and of a second control unit capable of being inserted into the recess in the first control unit and to be connected to it via electrical connection provided in the recess, said second control unit being equipped with an accelerometer and/or with tilt sensors and with a communicator for communicating with the video game console.

According to another advantageous embodiment, the first control unit includes the touch screen as the sole control member for direct interaction with the displayed information and/or images and the second control unit includes control buttons accessible through an opening in the recess.

A third aspect of the disclosure provides a game system including a home video game console, a central display device and at least two game controllers according to the second aspect of the invention, wherein each game controller is capable of being used in a network with other game controllers connected with the console, the central display device being capable of displaying information and/or images relating to the game, shared among the different game controllers and the display of each game controller being capable of displaying information and/or images relating to the game, and personalized information and/or images.

According to another advantageous embodiment, the personalized information and/or images are capable of being changed by way of signals received from the accelerometer and/or from the tilt sensors and/or by way of tactile commands received from the touch screen of the corresponding game controller.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 5a and 5b show two opposite side views of the first control unit;

FIG. 6 shows a reversed view of the first control unit;

Like reference symbols in the various drawings indicate like elements.

DETAILED DESCRIPTION

Figure 2:
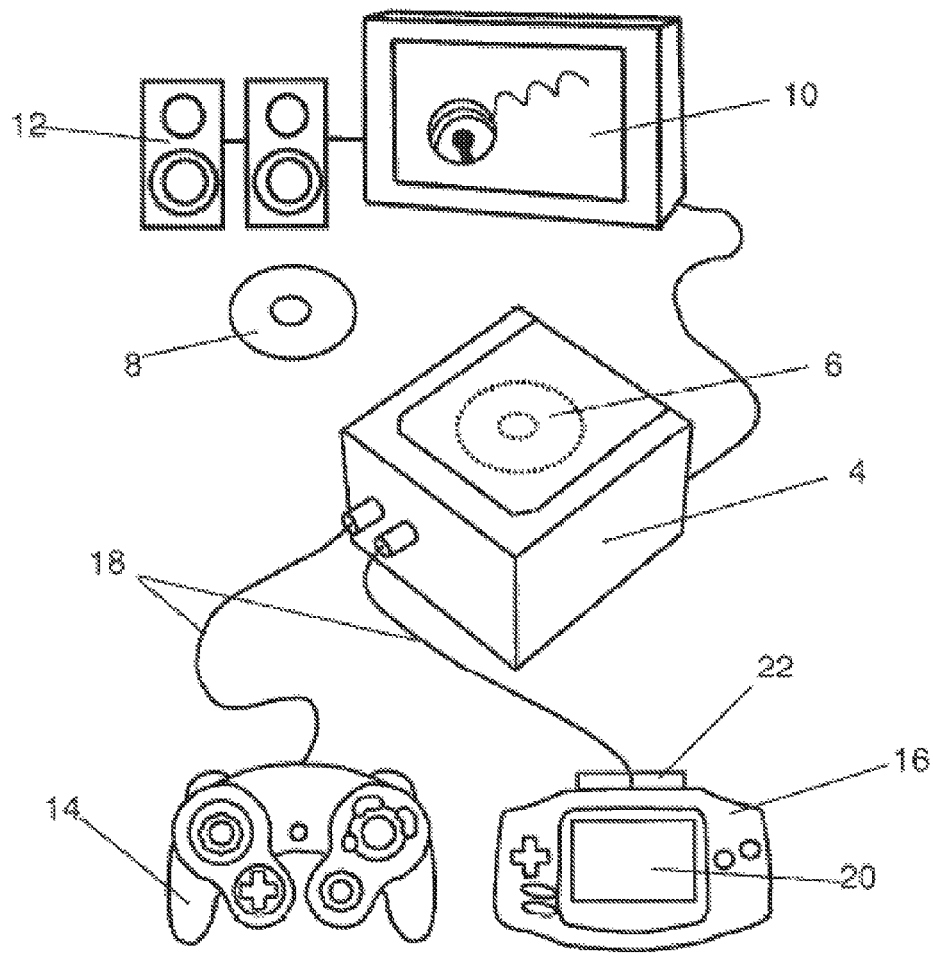
FIG. 2 is a perspective view of an immersive game system according to a first prior art.
Figure 3:
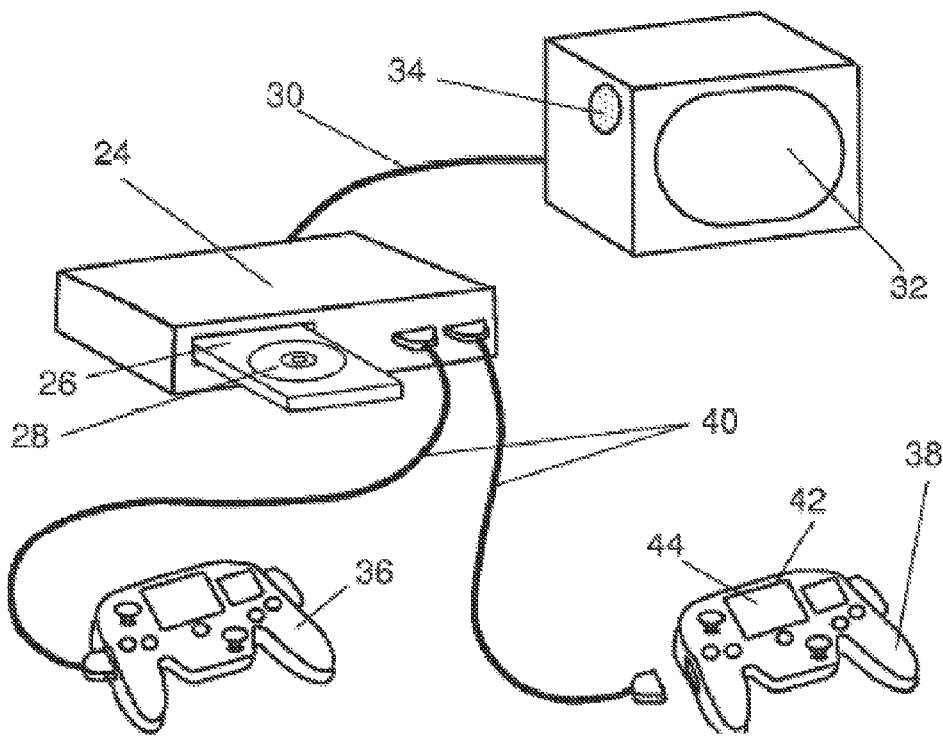
FIG. 3 is a perspective view of an interactive game system according to the prior art.
Figure 4:
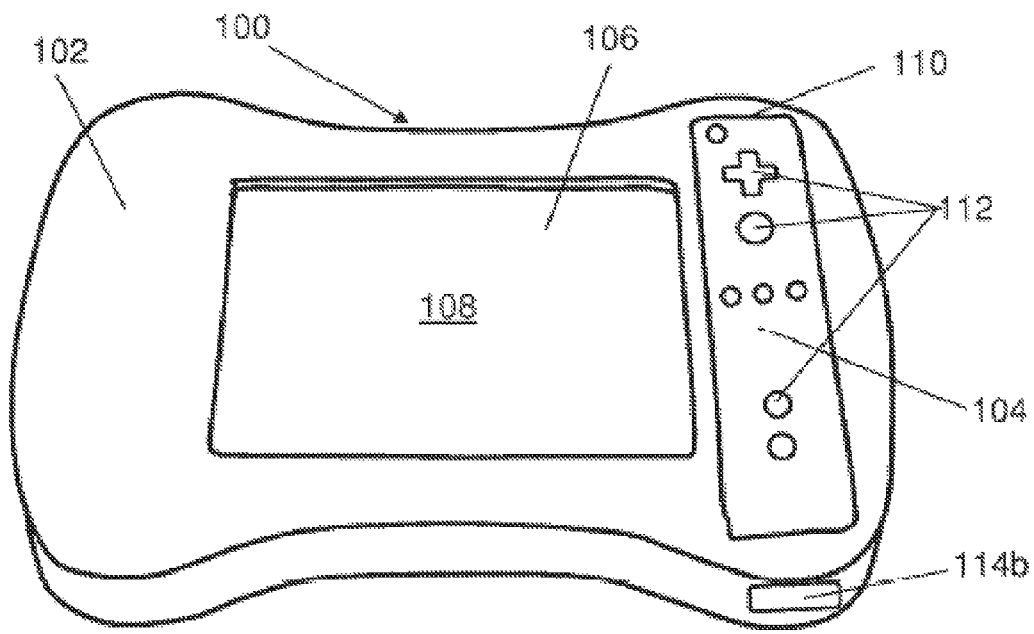
FIG. 4 shows a front view of an exemplary game controller including a first control unit having a second control unit inserted in the first control unit.

Referring to FIG. 4, in some implementations, a game controller 100 includes a first control unit 102 having a second control unit 104 inserted within. This game controller is designed to be integrated into a game system similar to those presented in FIGS. 2 and 3.

In some examples, the first control unit 102 includes a display 106, an LCD screen for example, enabling the display of information and/or images relating to the game in progress. This LCD screen is overlaid with a touch screen 108 capable of detecting tactile commands in the form of a sequence of locations touched on the screen. These commands make it possible to modify the displayed information and/or images. The first control unit 102 also includes a recess 110 designed to accommodate the second control unit 104. Advantageously, the first control unit includes only the touch screen as a control member for direct interaction with the flow of the game and hence with the displayed information and/or images.

Figure 1:
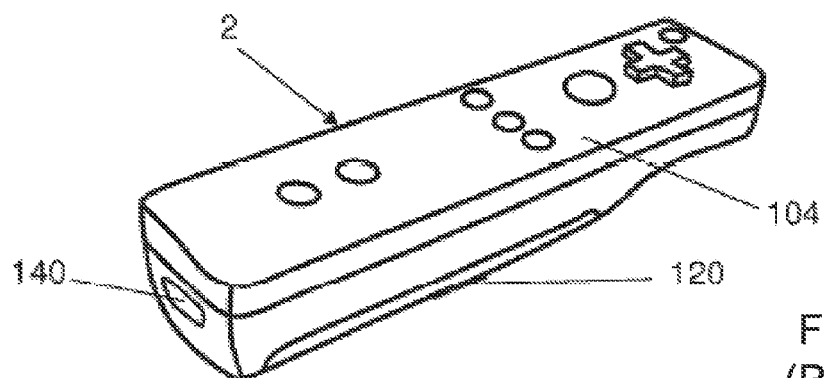
FIG. 1 is a perspective view of an existing control unit equipped with an accelerometer according to the prior art.

The second control unit 104 is a unit similar to that illustrated in FIG. 1. This control unit 104 is equipped with an accelerometer and/or with tilt sensors (not shown). An electrical connection (138, FIG. 6; 140, FIG. 1) between the two control units is provided such that the signals received by the accelerometer and/or the tilt sensors also make it possible to change the information and/or images displayed on the LCD screen. The recess 110 of the first control unit is made on the face bearing the display 106, so that control buttons 112 of the second control unit, placed on its upper surface, remain accessible. The control buttons 112 can be used in the traditional manner.

The signals received from the accelerometer and/or from the tilt sensors via the electrical connection with the second control unit and the tactile commands received via the touch screen are able to simultaneously change the displayed information and/or images. The combination of these two commands, namely detection of the motion of the game controller 100 and detection of touching performed on the screen 108 makes it possible to offer a new manner of play that is immersive and interactive, as will be illustrated with FIGS. 9a, 9b, 9c and 10b.

The first control unit 102 is connected to the game console of the system solely through the second control unit 104, which makes it possible to simplify the electronics of the first unit. To this end, the first unit may be connected to the second unit through a connector (140, FIG. 2) already present on the latter. For this purpose there is provided an internal cable (138, FIG. 7) reaching into the recess 110. In this manner all the tactile commands can be transmitted to the second unit, then to the console. A manual switch can be provided to operate this functionality.

FIG. 5a shows a side view of the first control unit 102. As mentioned previously, the second control unit advantageously includes means of communicating with the video game console, such as for example radio frequency or infrared transmission means. To ensure good transmission between the second control unit and the game console, it is arranged that the first control unit 102 includes, on one lateral face, an opening 114a located facing the communication means of the second control unit when it is inserted into the recess provided for this purpose.

In some implementations, it is provided that the first control unit be "ambidextrous", that is usable either by a right-handed or by a left-handed person. To this end, the first control unit 102 may exhibit a generally symmetrical shape with respect to the LCD screen 106. Thus to use the game controller 100 in a right-handed or left-handed configuration, one need only position the second control unit as shown FIG. 4 (right-handed configuration), or in FIG. 6 respectively (left-handed configuration). FIG. 5b shows a side view of the first control unit 102 that is opposite to FIG. 5a. To ensure good transmission between the second control unit and the game console, there is provided on the lateral face opposite that having the opening 114a an opening 114b also placed facing the communication means of the second control unit when it is inserted in the recess in the left-handed configuration. The openings 114a and 114b can be covered with a lens.

Returning to FIG. 6, it therefore shows a reversed view of the second control unit 102 wherein the second control unit 104 has been inserted, in the left-handed configuration.

Figure 10A:
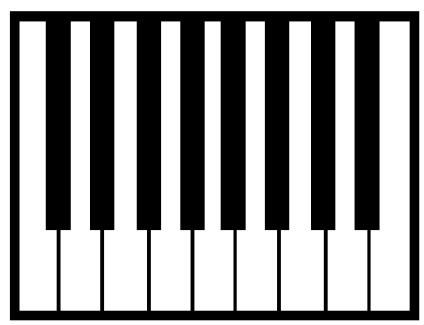
FIGS. 10a and 10b show the display of the first control unit according to two other game examples.

It is also arranged that the touch screen 108 can be provided with a peripheral frame 116 capable of holding game boards or grids as shown for example in FIG. 10a. Such a frame makes it possible to change the display that is visible by the player without the need to operate the display of the first control unit; only tactile commands on the touch screen are detected.

Figure 7:
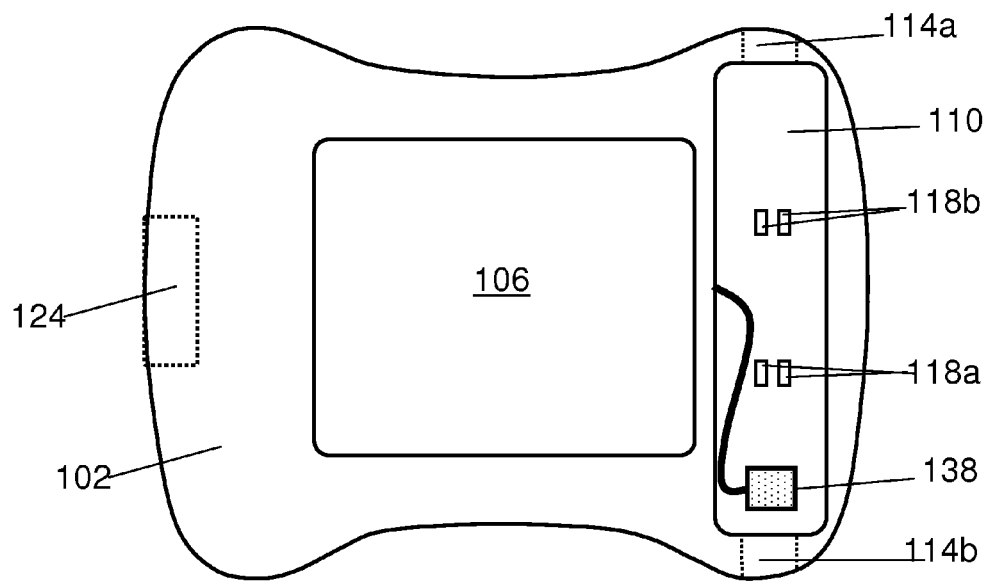
FIG. 7 shows a top view of the first control unit without the second control unit.

FIG. 7 shows a bottom view of the first control unit 102 without the second control unit in its recess 110. In this figure, the electrical connection 138 can be seen for the first unit designed to be connected with the connection (140, FIG. 1) of the second unit, as well as electrical contacts 118a (for the right-handed configuration), 118b (for the left-handed configuration) placed at the bottom of the recess 110 to make contact with corresponding contact means (120, FIG. 1) placed on the lower surface of the second unit (104, FIG. 1). Thus, when the second control unit is inserted in the right-handed configuration (FIG. 4), the contacts 120 of the second unit are in contact with the contacts 118a of the first unit, providing power supply to the first unit by the second, the electrical connection between the two control units being provided by the insertion of the connecting element 138 of the first unit into the corresponding connecting element 140 of the second unit. The communication means are then arranged facing the lateral opening 114a. Likewise, when the second control unit is inserted in the left-handed configuration (FIG. 6), the connecting elements 138 and 140 provide the electrical connection between the two control units while the electrical contacts 120 are in contact with the corresponding contacts 118b of the first unit, providing power supply to the first unit. In this other position, the communication means of the second unit are then arranged facing the lateral opening 114b.

To ensure the ambidextrous nature of the first control unit, it is provided that the display 106 is reversible. The electrical contacts 118a, 118b are then used as detectors for automatically detecting the insertion orientation of the control unit. Indeed, the contacts 118a or 118b respectively making contact with the corresponding contacts 120 of the second unit depending on the configuration used, enabling the determination of the insertion orientation of the second unit and to appropriately control the inversion of the display if necessary.

Figure 8:
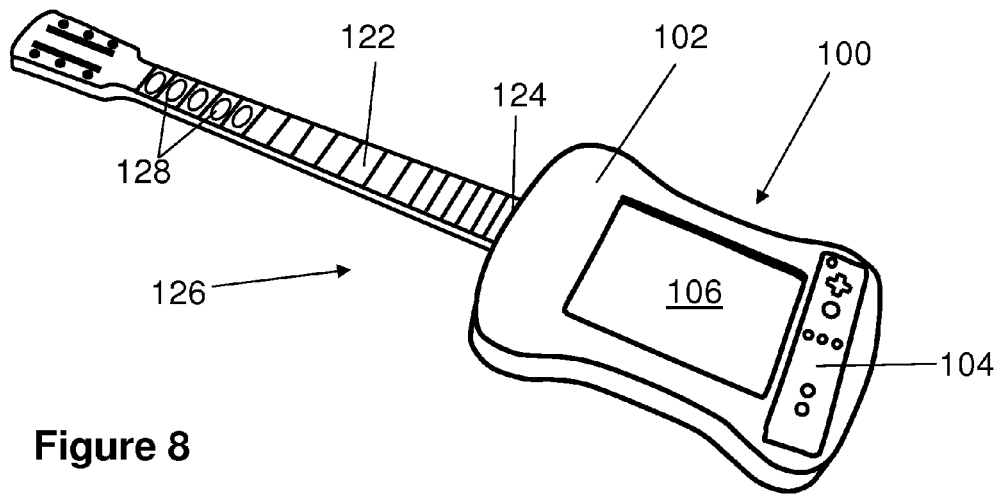
FIG. 8 shows a perspective view of the first control unit equipped with an accessory.

FIG. 8 shows the first control unit 102 equipped with an accessory 122. For this purpose, the first unit 102 includes a hollow recess 124 (see also FIG. 7), or alternatively a projecting plug, capable of receiving an accessory 122 so as to form an immersive assembly 126, as for example a guitar. It is arranged to provide the plug 124 with electrical connection with the accessory 122 so as to further increase the play possibilities with the game controller constituted by the two assembled control units 102 and 104. Thus for example the accessory 122, in the form of a handle, can include control buttons 128 making it possible to simulate the pressure of fingers on strings, while the LCD screen 106 will display the strings of the guitar and will detect through the touch-screen overlying it the player's strumming commands, and the second unit will be used to detect the motions of the player and to display them for example on the central screen connected to the console (not shown). More generally, it will be understood that the plug provided makes it possible to design an accessory for it to transform the appearance of the game controller and make it more immersive.

Figure 9A:
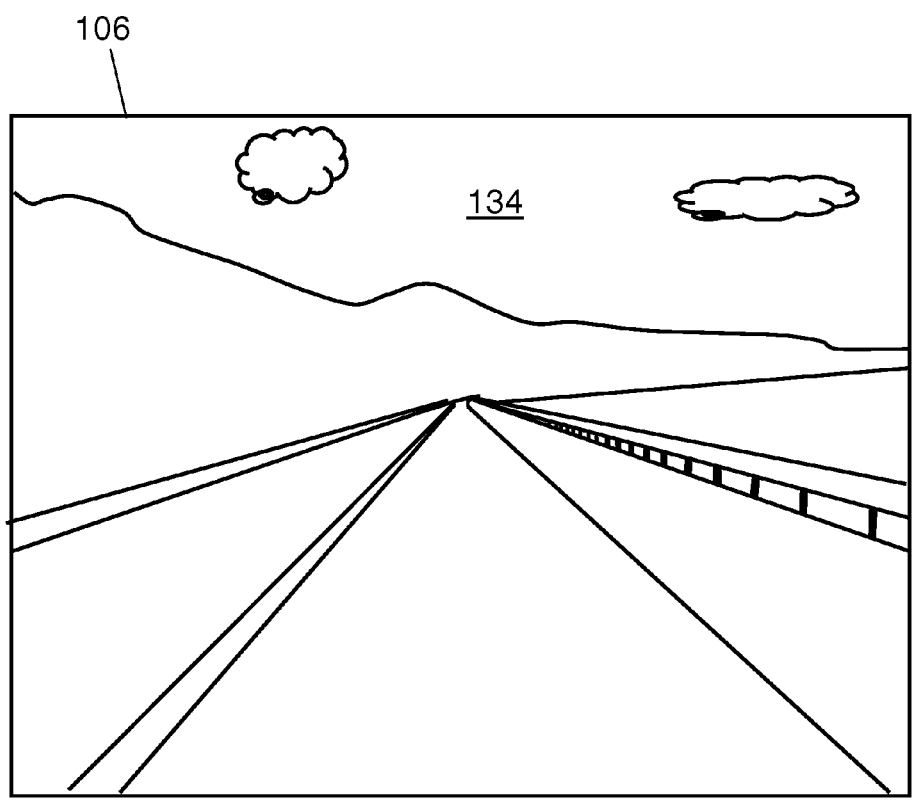
FIGS. 9a, 9b and 9c show a sequence of information and images displayed on the display of the first control unit according to one game example.
Figure 9B:
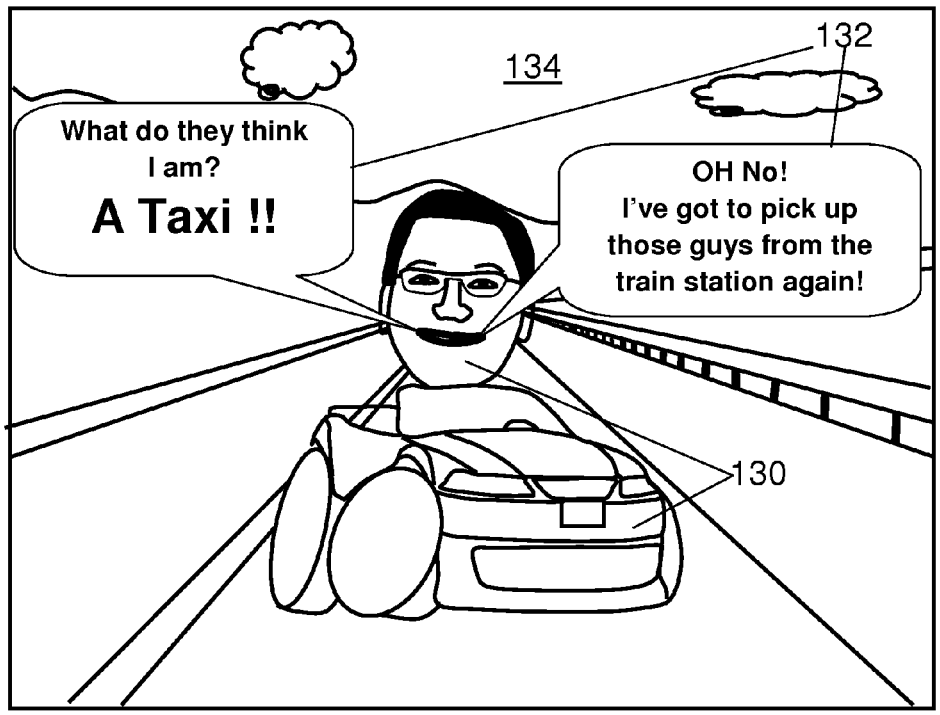
Figure 9C:
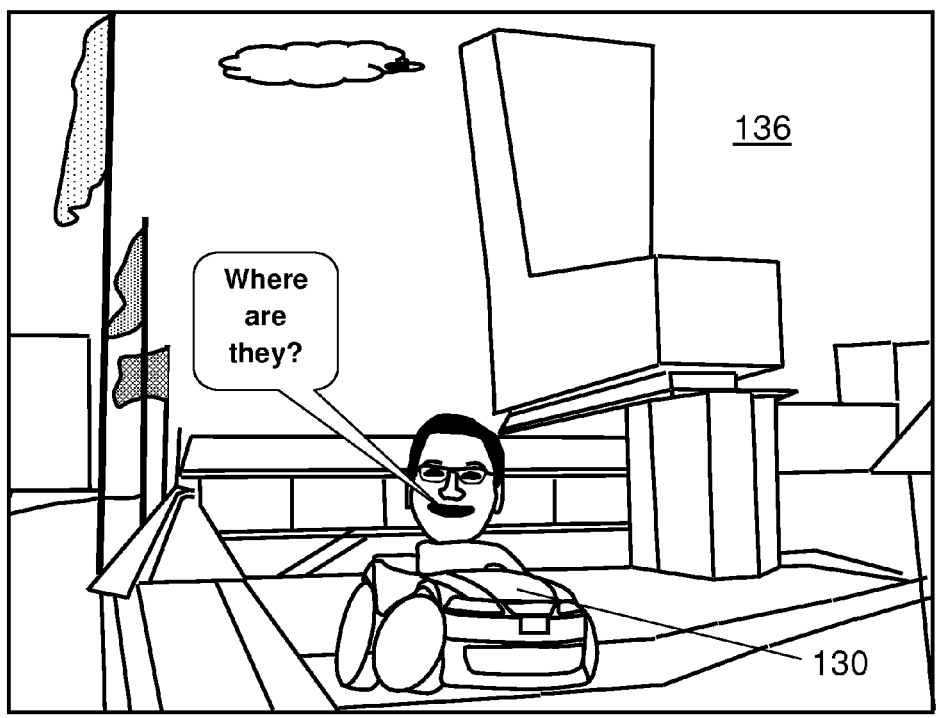

FIGS. 9a, 9b and 9c show a sequence of information and images displayed on the display 106 of the first control unit according to one interactive and immersive game example. FIG. 9a shows the selection of starting scenery 134 which can be obtained by any kind of command including tactile commands. Thereafter, the player can personalize the game by using personal images 130 showing for example his own car and his own face. He can also insert personalized dialogs 132. In the remainder of the game's flow, the user can use either tactile commands of the first control unit or the acceleration commands of the second control unit, or the two simultaneously, to change the display. Thus for example he can use his fingers on the touch screen to move his character or to change the dialogs in a pre-programmed list of dialogs. FIG. 9c shows a modified display whereon the character and his car 130 have moved so as to arrive at their destination. The movement between the initial scenery 134 (FIGS. 9a, 9b), showing a road, and the destination scenery 136 (FIG. 9c), showing a train station, can for example be carried out by signals received from the accelerometer of the second unit allowing the character and his car 130 to travel over a road circuit (image sequence not shown) connecting the departure and arrival scenery. During the movement carried out by using the game controller as a steering wheel, the player can be led to touch the screen to carry out additional actions provided in the game flow, such as for example to blow the horn by pressing twice on the touch screen, operating his turn signal by sliding his finger to the right or left on the screen, etc.

Figure 10B:
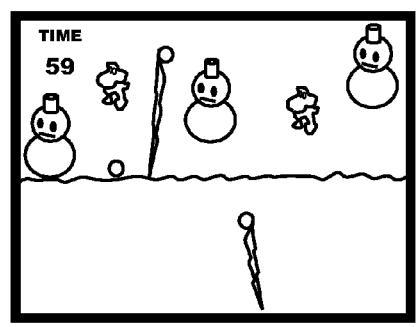

FIGS. 10a and 10b show the display of the first control unit according to two other game examples. FIG. 10a shows an example wherein a piano game board has been inserted into the frame shown in FIG. 6. At the same time, a piano simulation game is launched on the console enabling interpretation of the tactile commands received on the touch screen. Detection of the force and duration of finger contact on the piano keys can advantageously be provided to faithfully reproduce the sound that the same touch would have caused on a real piano. FIG. 10b shows an arcade game implementing snowmen behind which the characters can take shelter. The player for example will need, through tactile commands, to throw snowballs to hit the characters; likewise he can use sensors from the second unit to avoid snowballs thrown at him by another player.

Having presented the invention above by means of a few examples, it will be understood that the game controller resulting from the assembly of the two control units offers a large number of possibilities for the player in terms of immersion and interaction. In particular, the integration of a touch screen on the first unit provides great flexibility in addition to the possibilities offered by the acceleration or tilt sensors present on the second unit. The combination allows accurate control of the pointers and of the characters. It will also be understood that the use of such a controller proves to be very intuitive and that players have commands that are easy to use.

Among other applications that can be contemplated for such a controller can be mentioned painting, drawing, image and video processing, the creation of personalized animation that can be included in a dedicated game, word processing, and Internet navigation. This controller also proves to be well suited to educational games with the possible use of a stylus. Thus for example the program can ask for words to be entered and associate them with images shown on screen, to complete words by filling in missing letters, to form letters by using a special stylus. The program can also pronounce each letter and the word formed by the letters to help in teaching sounds. The program can also read stories while allowing the player to interact with the story by pressing on the touch screen or to immerse himself by using the commands of the second unit. The player can also personalize the characters and add them to the story with their own names (see FIGS. 9a, 9b, 9c), as well as the audio environment by adding music and sound effects of their creations and thus create their true animated story. Specific game grids can be set in the frame provided for this purpose for the different parts of the game or the story. It is understood that such a controller has the advantage of helping children to intuitively develop coordination between their hand and their eyes, as well as to develop their creativity.

As has often been mentioned, such a game controller advantageously makes it possible to take advantage of two commands, one tactile and the other by motion detection, to provide games with an immersive and interactive interface. For example, a maze game wherein the player must move a ball by moving the game controller which applies the motions performed and detected thanks to the sensors of the second control unit, while still at the same time avoiding traps, by using tactile screen tapping or rubbing commands at designated places, or even drawing something that allows him to avoid the trap that is set, for example a bridge to cross a river and thus progress within the maze.

It can finally be noted that such a game controller is particularly suited for network games for which certain information and/or images must be displayed only for the player concerned through his controller and where other information and/or images are displayed so as to be visible to all players on the central screen of the game system.

It will be understood that various modifications and/or improvements that are obvious to the person skilled in the art can be applied to the different embodiments of the invention described in the present description without departing from the scope of the invention defined by the appended claims. Accordingly, other implementations are within the scope of the following claims.

The invention claimed is:

1. A control unit for a home video game console, the control unit comprising:
    a control unit body;
    a display supported by the control unit body for displaying information or images relating to the game; and
    a recess defined by the control unit body for accommodating a second control unit equipped with at least one of an accelerometer or tilt sensors, the recess having an electrical connection between the two control units, wherein the displayed information or images are changed in response to signals received by the accelerometer or the tilt sensors and transmitted to the display through the electrical connection, and a touch screen overlying at least partially over the display wherein the touch screen detecting tactile commands includes a sequence of locations touched on the screen able to change the displayed information and/or images.

2. The control unit of claim 1, wherein the changed information or images are transmitted through the electrical connection to the second control unit having a communicator for communicating with the video game console.

3. The control unit of claim 1, wherein the signals received from the accelerometer or the tilt sensors through the electrical connection with the second control unit and the tactile commands received via the touch screen are able to simultaneously change the displayed information and/or images.

4. The control unit of claim 1, wherein a power supply is provided by the second control unit via electrical contacts.

5. The control unit of claim 1, wherein the touch screen is the sole control member of the control unit for direct interaction with the displayed information or images.

6. The control unit of claim 5, wherein the recess is arranged on the face bearing the display, wherein control buttons of the second control unit are accessible and an opening is made in a lateral face facing the communicator of the second control unit when it is inserted into the recess.

7. The control unit of claim 1, wherein the display is reversible and wherein the recess receives the second control unit in two reversed positions and includes a detector for detecting the insertion orientation of the second control unit for controlling the reversal of the display.

8. The control unit of claim 7, wherein the detector automatically detects the orientation of the second control unit by the electrical power supply contacts placed at the bottom of the recess.

9. The control unit of claim 1, wherein the touch screen includes a peripheral frame arranged for holding game grids.

10. The control unit of claim 1, wherein the control unit body defines a second recess for receiving an accessory to constitute an immersive assembly.

11. The control unit of claim 10, wherein the second recess includes an electrical connection for connecting with the accessory.

12. The control unit of claim 1, wherein the body further includes a second recess defined by the control unit body for receiving an accessory to constitute an immersive assembly.

13. A game controller comprising:
a first control unit comprising:
   a control unit body;
   a display supported by the control unit body for displaying information or images relating to the game; and
   a recess defined by the control unit body for accommodating a second control unit equipped with at least one of an accelerometer or tilt sensors, the recess having an electrical connection between the two control units, wherein the displayed information or images are changed in response to signals received by the accelerometer or the tilt sensors and transmitted to the display through the electrical connection, and a touch screen overlying at least partially over the display wherein the touch screen detecting tactile commands including a sequence of locations touched on the screen able to change the displayed information or images; and
a second control unit insertable into the recess in the first control unit and connectable to the first control unit via the electrical connection in the recess, the second control unit having at least one of an accelerometer or tilt sensors, and a communicator for communicating with the video game console.

14. The game controller of claim 13, wherein the first control unit includes the touch screen as the sole control member for direct interaction with the displayed information or images and wherein the second control unit includes control buttons that are accessible through an opening in the recess.

15. The control unit of claim 13, wherein the display is reversible and wherein the recess receives the second control unit in two reversed positions and includes a detector for detecting the insertion orientation of the second control unit for controlling the reversal of the display means.

16. A game system comprising:
a home video game console;
a central display device; and
at least two game controllers, wherein each game controller comprises:
   a display supported by the control unit body for displaying information and/or images relating to the game; and
   a recess defined by the control unit body for accommodating a second control unit equipped with at least one of an accelerometer or tilt sensors, the recess having an electrical connection between the two control units, wherein the displayed information or images are changed in response to signals received by the accelerometer or the tilt sensors and transmitted to the display through the electrical connection, and a touch screen overlying at least partially over the display wherein the touch screen detecting tactile commands including a sequence of locations touched on the screen able to change the displayed information or images; and each game controller is usable in a network with other game controllers connected to the console, the display device displaying information or images relating to the game, shared between the different game controllers and the display of each game controller arranged for displaying information or images relating to the game and personalized information and/or images.

17. The game system of claim 16, wherein the personalized information or images change simultaneously in response to the signals received from the accelerometer or the tilt sensors and/or in response to the tactile commands received from the touch screen of the corresponding game controller.

18. The control unit of claim 15, wherein the detector automatically detects the orientation of the second control unit by the electrical power supply contacts placed at the bottom of the recess.

19. The control unit of claim 16, wherein the display is reversible and wherein the recess receives the second control unit in two reversed positions and includes a detector for detecting the insertion orientation of the second control unit acting as means for controlling the reversal of the display means.

20. The control unit of claim 19, wherein the detector automatically detects the orientation of the second control unit by the electrical power supply contacts placed at the bottom of the recess.

\* \* \* \* \*